May 1, 1951     F. R. McGUIRE     2,551,448
MECHANICAL BRAKE FOR VEHICLES
Filed Oct. 2, 1947     2 Sheets-Sheet 1
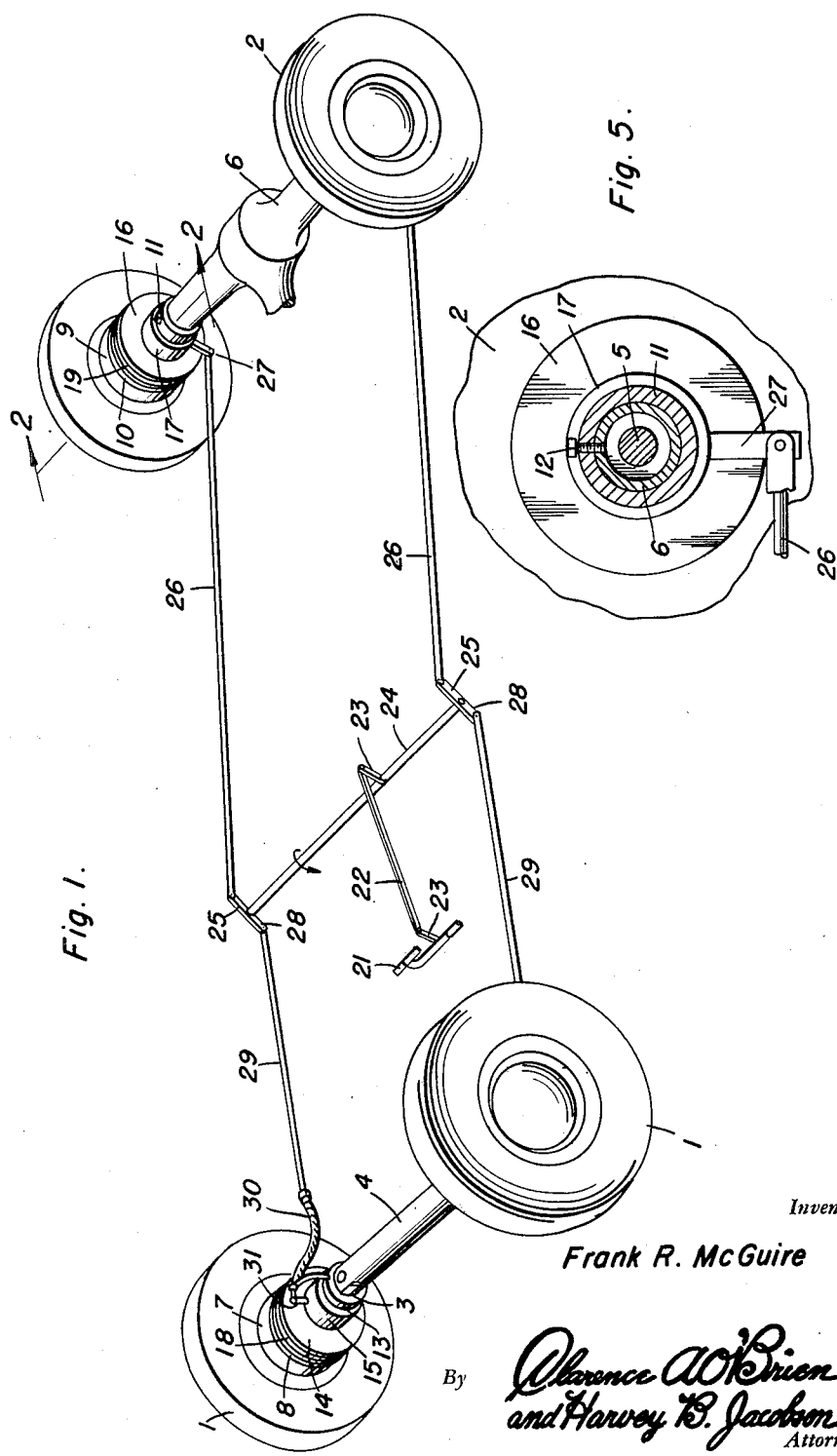
Inventor
Frank R. McGuire May 1, 1951 F. R. McGUIRE 2,551,448
MECHANICAL BRAKE FOR VEHICLES
Filed Oct. 2, 1947 2 Sheets-Sheet 2
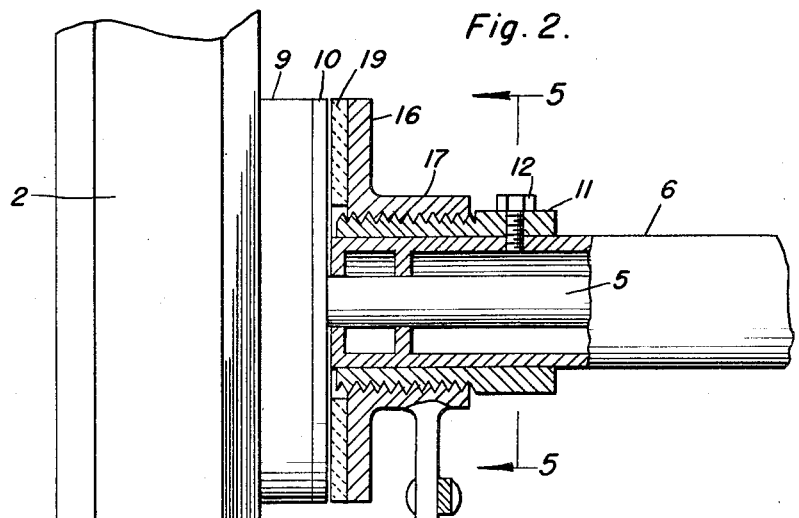
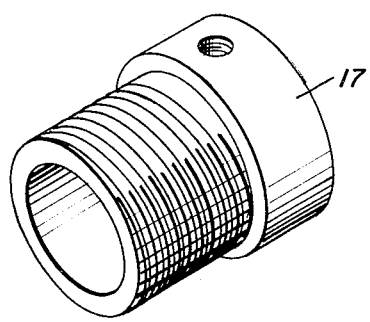
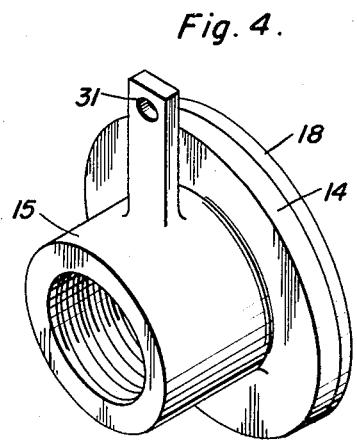
Inventor
Frank R. McGuire Patented May 1, 1951

2,551,448

UNITED STATES PATENT OFFICE 2,551,448

MECHANICAL BRAKE FOR VEHICLES

Frank R. McGuire, Maybee, Mich.

Application October 2, 1947, Serial No. 777,511

1 Claim. (Cl. 188—10)

My invention relates to improvements in mechanical brakes for vehicles, the primary object in view being to provide four-wheel brake equipment of the type indicated which is greatly simplified, as compared with brakes as commonly constructed, and which is quick acting, but not liable to grab or lock, provides for a greater area of braking surface than the usual brakes, and is not susceptible to undue wear.

Other and subordinate objects within the purview of my invention, together with the precise nature of my improvements, will be readily understood when the succeeding description and claim are read with reference to the drawings accompanying and forming part of this specification.

In said drawings:

Figure 1 is a view in perspective illustrating my invention in a preferred embodiment thereof;

Figure 2 is a fragmentary view in vertical longitudinal section taken on the line 2—2 of Figure 1 and drawn to an enlarged scale;

Figure 3 is a view in perspective of one of the sleeves;

Figure 4 is a similar view of one of the complemental brake disks; and

Figure 5 is a view in transverse section taken on the line 5—5 of Figure 2.

Referring now to the drawings by numerals, my improved brakes have been shown therein, for the purpose of illustrating a preferred embodiment of the invention, as applied to the front and rear wheels 1, 2 of a vehicle running gear, the front wheels 1 being rotatable on axles, not shown, on steering knuckles 3 connected by a tubular tie member 4. The rear axles, one of which is shown at 5, are rotatable in the usual rear axle and differential housing 6.

According to my invention, the usual brake drums 7 of the front wheels 1 are each provided on the back thereof with an annular, concentric brake disk 8 which may be secured to said drum 7 in any suitable manner, and the usual brake drums 9 of the rear wheels 2 are similarly provided with similar brake disks 10. The brake disks 8, 10 are preferably formed of hard surfaced, polished steel.

Complemental brake disks for the brake disks 8, 10 are provided and mounted for cooperation therewith in a manner now to be described.

A pair of externally threaded sleeves 11, one of which is shown in Figures 1, 2 and 5, are fixed upon opposite ends of the rear axle and differential housing 6 concentrically of the rear wheels 2 by bolts, as at 12, and a pair of similar sleeves, one of which is shown in Figures 1 and 4 and designated 13, are similarly fixed on the steering knuckles 3 concentrically of the front wheels 1.

A single annular, laterally adjustable brake disk 14, with an internally threaded hub 15 is provided on each sleeve 13 on the steering knuckle 3 with the threads thereof engaging the threads on said sleeve, and brake disks 16, similar to the brake disks 14, on internally threaded hubs 17 are provided on the sleeves 11 in the same manner as said disks 14, the arrangement of said disks 14, 16 on the threaded sleeves 11, 13 being such that by rotation of said hubs 15, 17 reversely of the direction of rotation of said wheels, in forward travel thereof, the brake disks 14, 16 will be screw fed and adjusted toward the brake disks 8, 10 into braking relation thereto.

Annular brake liners 18, 19 are suitably fixed on the faces of the brake disks 14, 16, respectively, and which may be formed of any suitable friction material.

Means are provided for rotating the hubs 15, 17 in the described direction by depression of the usual brake pedal 21 and comprising the following.

The brake pedal 21 is operatively connected, by a pivoted link 22 and crank arms 23, to a rock shaft 24, which may be journaled in any suitable manner on the vehicle to extend transversely thereof and be rocked by depression of said pedal 21 in one direction. Crank arms 25 on the ends of said rock shaft 24 are connected by pivoted pull rods 26 to depending crank arms 27 on the hubs 17 so that such rocking of the rock shaft 24 will rotate said hubs 17 in the direction described. Crank arms 28 on the ends of the rock shaft 24 extending therefrom oppositely relative to the crank arms 25 are connected by pivoted pull rods 29 and the conventional flexible sheath and rod sections 30 to upstanding crank arms 31 on the hubs 15, whereby such rocking of the rock shaft 21 will result in rotation of the hubs 15 in the described direction.

As will readily be seen, upon rotation of the hubs 15, 17 in the described direction, the brake disks 14, 16 will be screw fed toward the brake disks 8, 10 into frictional engagement therewith to brake the wheels 1, 2. Upon release of the brake pedal 21 and return thereof to normal position, as by the conventional spring, not shown, the hubs 15, 17 will be rotated in the same direction as the wheels 1, 2, in forward travel of said wheels, to release the brakes, and this releasing action will be facilitated by the rotation of the brake disks 8, 10 by the wheels 1, 2, said brake disks 8, 10 being thus rotated in a direction tending to move the brake disks 14, 16 toward releasing position through frictional engagement therewith.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described my invention, what is claimed as new is:

A brake for a vehicle wheel with a brake drum thereon comprising a brake disk mounted on said drum outside the same for rotation thereby, a complemental brake disk for the drum mounted brake disk, means rotatably mounting the complemental brake disk for lateral screw feed adjustment into and from engagement with the drum mounted brake disk, and pedal operated means for rotating said complemental brake disk to adjust the same into engagement with said drum mounted disk, said complemental brake disk being rotatable to adjust the same into engagement with the drum mounted disk reversely relative to the direction of rotation of said drum mounted disk in forward travel of said wheel, said complemental brake disk being rotatable by said drum mounted disk in forward travel of said wheel to disengage said drum mounted disk.

FRANK R. McGUIRE.

REFERENCES CITED

The following references are of record in the file of this patent:

UNITED STATES PATENTS

| Number | Name | Date |
| --- | --- | --- |
| 1,604,060 | Matthews | Oct. 19, 1926 |
| 1,612,356 | Bregoz | Dec. 28, 1926 |
| 1,718,021 | Andrews | June 18, 1929 |
| 1,795,719 | Hardison | Mar. 10, 1931 |
| 1,863,556 | Cottrell | June 21, 1932 |
| 1,928,866 | Newhart | Oct. 3, 1933 |